United States Patent
Rohleder et al.

(10) Patent No.: US 9,619,647 B2
(45) Date of Patent: Apr. 11, 2017

(54) INTEGRATED CIRCUIT ACCESS

(71) Applicant: FREESCALE SEMICONDUCTOR, INC., Austin, TX (US)

(72) Inventors: Michael Rohleder, Unterschleissheim (DE); Stefan Doll, Munich (DE); Clemens Alfred Roettgermann, Munich (DE)

(73) Assignee: NXP USA, Inc., Austin, TX (US)

( * ) Notice: Subject to any disclaimer, the term of this patent is extended or adjusted under 35 U.S.C. 154(b) by 29 days.

(21) Appl. No.: 14/706,128

(22) Filed: May 7, 2015

(65) Prior Publication Data
US 2016/0328554 A1  Nov. 10, 2016

(51) Int. Cl.
| | | |
|---|---|---|
| *H04L 29/06* | (2006.01) |
| *G06F 21/44* | (2013.01) |
| *G06F 21/57* | (2013.01) |
| *G06F 21/75* | (2013.01) |
| *G06K 19/073* | (2006.01) |
| *G09C 1/00* | (2006.01) |

(52) U.S. Cl.
CPC .............. *G06F 21/44* (2013.01); *G06F 21/57* (2013.01); *G06F 21/75* (2013.01); *G06K 19/073* (2013.01); *G09C 1/00* (2013.01); *G06F 2221/2143* (2013.01)

(58) Field of Classification Search
CPC .......... G06F 21/44; G06F 21/57; G06F 21/75; G06K 19/073; G09C 1/00
USPC ........................................................... 726/2
See application file for complete search history.

(56) References Cited

U.S. PATENT DOCUMENTS

| | | | | |
|---|---|---|---|---|
| 5,671,394 A | * | 9/1997 | Katsuta | G11C 29/52 711/164 |
| 6,108,789 A | * | 8/2000 | Dancs | G06Q 20/3552 380/255 |
| 6,138,236 A | * | 10/2000 | Mirov | G06F 9/24 712/E9.007 |
| 6,367,017 B1 | * | 4/2002 | Gray | G06F 21/10 340/5.2 |
| 6,393,564 B1 | * | 5/2002 | Kanemitsu | H04L 9/0877 380/277 |

(Continued)

OTHER PUBLICATIONS

European Search Report mailed Aug. 12, 2016 for corresponding EP 16 15 7621, 2 pages.

(Continued)

*Primary Examiner* — Michael S McNally

(57) ABSTRACT

A method provides access to an integrated circuit which may comprise a storage containing an unalterable first security key and a memory containing a second security key. The method may comprise:
checking the second security key by comparing the first security key and the second security key,
if the second security key is valid,
providing access to the integrated circuit, optionally depending on the validity of an access key, and
if the second security key is invalid,
enabling erasing the memory, and
storing in the memory a new second security key which corresponds to the first security key.
Erasing the memory may be followed by checking the erasing for completeness.

20 Claims, 2 Drawing Sheets

(56) References Cited

U.S. PATENT DOCUMENTS

| | | | |
|---|---|---|---|
| 6,742,117 B1* | 5/2004 | Hikita | G06Q 20/341 |
| | | | 235/375 |
| 7,623,378 B1 | 11/2009 | Wahlstrom et al. | |
| 7,940,073 B1 | 5/2011 | Stewart | |
| 8,175,276 B2 | 5/2012 | Tkacik et al. | |
| 8,484,486 B2 | 7/2013 | Deierling et al. | |
| 2003/0131210 A1 | 7/2003 | Mueller | |
| 2003/0172265 A1* | 9/2003 | Vu | G01S 13/9023 |
| | | | 713/164 |
| 2006/0041932 A1* | 2/2006 | Cromer | H04L 9/3226 |
| | | | 726/6 |
| 2007/0237325 A1 | 10/2007 | Gershowitz et al. | |
| 2009/0172265 A1* | 7/2009 | Park | G06F 12/0246 |
| | | | 711/103 |
| 2009/0241200 A1 | 9/2009 | Li et al. | |
| 2014/0025947 A1 | 1/2014 | Jaber et al. | |
| 2014/0223524 A1* | 8/2014 | Lu | H04L 9/0891 |
| | | | 726/6 |
| 2015/0121457 A1* | 4/2015 | Schwarz | G06F 3/0484 |
| | | | 726/3 |

OTHER PUBLICATIONS

Kilopass, "Security: CMOS Antifuse NVM Security," printed from <<www.kilopass.com/technology/security/>> on Nov. 3, 2016, 2 pages.

* cited by examiner

INTEGRATED CIRCUIT ACCESS

FIELD OF THE INVENTION

This invention relates to integrated circuit access. More in particular, the present invention relates to an integrated circuit configured for providing secure access, as well as to a user device provided with such an integrated circuit and a method of providing secure access to an integrated circuit.

BACKGROUND OF THE INVENTION

It is known to restrict access to integrated circuits, in particular to the memories of integrated circuits, to prevent tampering, that is, unauthorized modifications of their contents. One particular form of tampering is storing such information in the integrated circuit that the integrated circuit behaves as if it is uninitialized. As the uninitialized state of an integrated circuit typically permits full access to all its features (for example for testing purposes), such tampering should be prevented. Some tampering prevention solutions depend on the proper functioning of a tamper detection circuit, which itself could be the target of tampering and may therefore not always be reliable.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. In the figures, elements which correspond to elements already described may have the same reference numerals.

DETAILED DESCRIPTION OF THE PREFERRED EMBODIMENTS

An integrated circuit and a method of providing access to an integrated circuit will be described. In embodiments of the invention, the integrated circuit includes a memory in which a security key can be stored. When accessing the integrated circuit, the security key stored in the memory can be compared with a security key stored in another part of the integrated circuit. Access to the integrated circuit can be granted when the security keys match and can be denied when the security keys fail to match. If the keys fail to match, the memory of the integrated circuit can only be erased, thus erasing the non-matching security key and any other content. After the erase, a new security key can be stored in memory. In this way, it can be ascertained that an integrated circuit is properly initialized.

In the following, for sake of understanding, the circuitry is described in operation. However, it will be apparent that the respective elements are arranged to perform the functions being described as performed by them.

Figure 1:
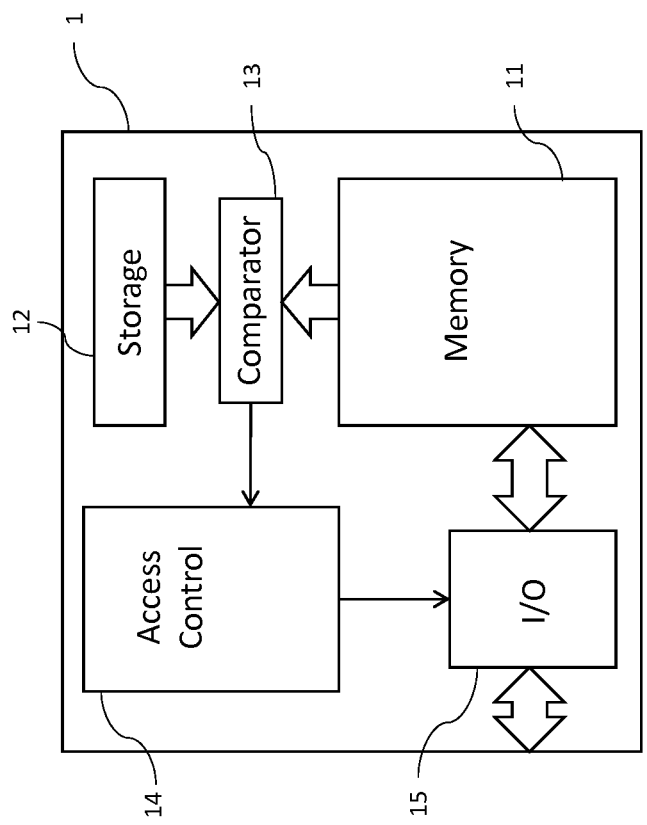
FIG. 1 schematically shows a first example of an embodiment of an integrated circuit including a memory.

An exemplary integrated circuit in accordance with an embodiment of the present invention is schematically illustrated in FIG. 1. The integrated circuit 1 of FIG. 1 includes a memory unit 11, a storage unit 12, a comparator unit 13, an access control unit 14, and an input/output (I/O) unit 15. The integrated circuit 1 may include additional components but such components are not shown in FIG. 1 for the sake of clarity of the illustration.

The memory unit 11 may be a so-called flash memory, a semiconductor memory in which data can be stored but from which the data can also be deleted. The memory unit 11 is preferably non-volatile, preserving the stored data when power is off. Stored data can be exchanged, via the I/O unit 15, between the memory unit 11 and circuits outside the integrated circuit 1, as shown in FIG. 1. Data stored in the memory unit 11 may also be exchanged, via the I/O unit 15, with other units (not shown in FIG. 1) inside the integrated circuit 1.

The storage unit 12 can be configured for permanently storing a security key. Several embodiments of the storage unit 12 are possible, for example an embodiment using synthesized logic which provides an unalterable bit pattern as security key. In another embodiment, a hard-wired and therefore unalterable memory is used which may be referred to as read-only memory. Yet another embodiment may include a programmable read-only memory (PROM) having fuses or antifuses that can be blown to permanently store information.

The security key in the storage unit 12 will be referred to as first security key. To prevent fraudulent use of the security key, the storage unit 12 can be arranged in such a way that its contents can only be read out by the comparator unit 13, not by other units.

The comparator unit 13 is configured for comparing the contents of the storage unit 12 and the contents of certain locations of the memory unit 11, which contain a second security key. If the contents of the storage unit 12 and the contents of those locations of the memory unit 11 match, then the comparator unit 13 sends a positive comparator signal to the access control unit 14. If the contents of the storage unit 12 and the contents of those locations of the memory unit 11 fail to match, then the comparator unit 13 sends a negative comparator signal to the access control unit 14.

It is noted that the terms "positive" and "negative" as used here refer to the meaning of the comparator signal, not to its particular polarity. It is further noted that the match of the contents of the locations of the memory unit 11 and the contents of the storage unit 12 typically but not necessarily means that the first and the second security keys are identical. Embodiments can be envisaged in which only parts of the security keys are compared, and/or in which a predefined deviation of the security keys (for example a limited number of non-identical bits) still results in a match. Additionally, or alternatively, the security keys may be said to match if they have matching transforms, which transforms may or may not be cryptographic transforms. The security keys can have any desired length, for example 16 bits, 32 bits, 64 bits, 128 bits, 256 bits or longer.

In response to a positive comparator signal, the access control unit 14 can directly grant access by supplying an enable signal to the I/O unit 15 so as to allow the I/O unit to write data to or retrieve data from the memory unit 11. Alternatively, the access control unit 14 may continue with a further security check, which involves an access key. This access key, which typically is distinct from the security key, serves to verify access permissions to memory.

An access key will typically be received from another device external to the integrated circuit, for example from a keypad or from a computer, and be compared with an access key stored in the memory of the integrated circuit. If the received access key and the stored access key match, for example because they are identical, then access to the memory of the integrated circuit will be granted, otherwise access may be denied. The matching of the received access key and the stored access key may be determined using a further comparator (not shown in FIG. 1 for the sake of clarity of the illustration). The access key may be stored in memory after initialization of the integrated circuit, for example by an end user. It is noted that the access key will later be further explained with reference to FIGS. 2 and 3.

The security keys make it possible to distinguish an uninitialized integrated circuit from an initialized one, in particular when the security key has a bit pattern which is very unlikely to occur in uninitialized integrated circuits. The access keys make it possible to control access to the memory once the integrated circuit has been initialized. It is noted that different parties may use different keys, for different purposes. An integrated circuits manufacturer, for example, may use the security key while an electronics apparatus manufacturer, who uses the integrated circuits in his products, may use the access key.

It can thus be seen that the integrated circuit 1 of FIG. 1 is configured for only allowing access to the memory unit 11 when the access control unit 14, aided by the comparator unit 13, has established that the (second) security key stored in the memory unit 11 matches the (first) security key stored in the storage unit 12. This match indicates that the memory contents have not been tampered with. More in particular, this match can be used to establish that the integrated circuit has been properly initialized. This can be accomplished by configuring the integrated circuit 1 in such a way that the absence of a match between the first and second security keys not only inhibits memory access, but all operations related to memory except for a memory erase operation. The access control unit 14 can be configured for this purpose, using the comparator signal. A memory access verification step, in which the validity of an access key is checked, can therefore only be carried out when the security keys are found to match.

The comparison can be carried out after a reset of the integrated circuit. A positive comparator signal (that is, matching security keys) after the reset results in the I/O circuit being enabled, thus allowing memory access, since all memory operations may be enabled (possibly only after an access verification step involving an access key). A negative comparator signal (that is, non-matching security keys), however, results in the I/O circuit disabling reading and writing operations, and all memory operations except erase being disabled as well. As a result, the integrated circuit cannot be used before the memory is erased (it is noted that the storage 12 cannot be erased).

This feature is particularly useful for distinguishing uninitialized or "virgin" integrated circuits from initialized integrated circuits: uninitialized integrated circuits will hold no valid security key in memory, while properly initialized integrated circuits will. Accordingly, all integrated circuits can be initialized by storing a valid security key (matching the unalterable security key) in memory, the initialization requiring a complete erasing of the memory prior to storing the security key.

This feature is further particularly useful for separating the common access protection which may be implemented using access keys from a type of access protection which only needs to distinguish between an initialized device and an uninitialized device, as is the case directly after manufacture of an integrated circuit. A newly manufactured integrated circuit will typically not have a valid access key, but for testing purposes a complete access to the integrated circuit is necessary. By granting access to the integrated circuit after erasing its memory, the availability of an access key is no longer relevant.

It is noted that in FIG. 1 only a single memory unit 11 is shown, but that the integrated circuit 1 may include more than one memory unit, for example two, four or eight memory units. It will be understood that any erase operation made necessary by a negative comparator signal as described above will typically erase all memory units of the integrated circuit. It will further be understood that the storage 12 will not be affected by such an erase operation.

Figure 2:
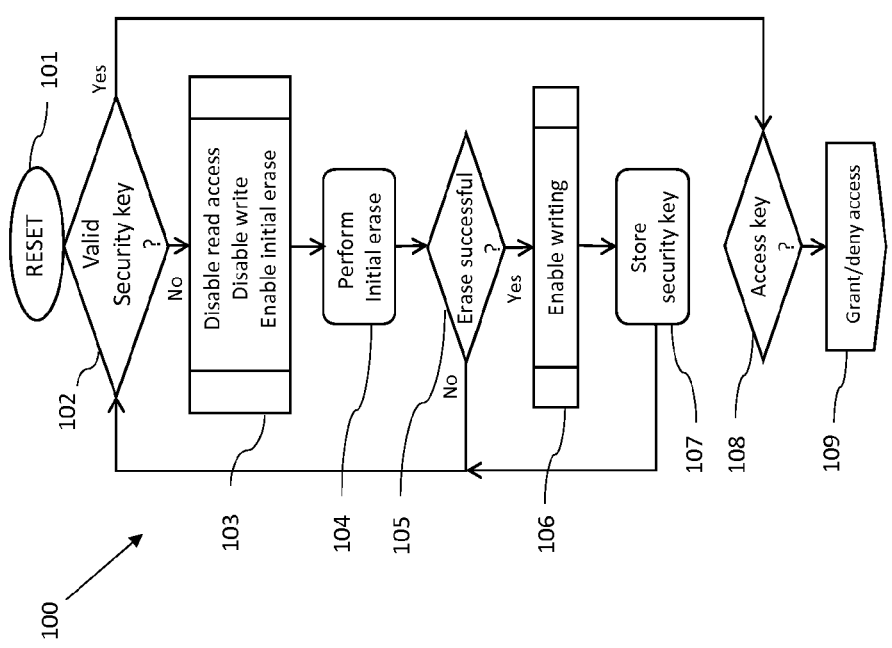
FIG. 2 schematically shows an example of an embodiment of a method of providing access to an integrated circuit.

An embodiment of a method in accordance with the invention will be explained with reference to FIG. 2. The exemplary sequence 100 starts with a reset step 101, in which the integrated circuit is reset. Although embodiments may be envisaged which do not include a reset step, such an initial step forces the integrated circuit to be in a well-defined state.

In the next step 102, the validity of the security key stored in memory is checked, that is, a check is made whether the (second) security key retrieved from the memory unit matches the (first) security key in the storage unit. If there is a match ("Yes"), then there is a valid security key and the method continues with step 108, in which the presence of a valid access key in memory may be checked.

An access key is an additional security measure which may be applied independently from the security key. It is noted that the access key and the security key are preferably two separate, distinct keys stored at different memory locations, and that use of an access key (or access keys) is optional. It is further noted that erasing the memory will also erase the access key. Two or more distinct access keys may be used to control access to different parts of the integrated circuit. If there is a valid access key, or if there are valid access keys, then access to the integrated circuit is granted in step 109. If no valid access key is identified, then access is denied.

Returning to step 102 in which the validity of the security key was checked, if there is no match ("No"), then there is no valid security key (which means that the integrated circuit has not, or not properly, been initialized) and the method continues with step 103.

In step 103, memory operations such as read access and write access are disabled. However, an (initial) erase operation is enabled. As a result, the only enabled memory operation is an (initial) erase operation. It is noted that an initial erase operation typically erases the entire memory so as to initialize the memory, clearing any previous contents.

In step 104, the (initial or other) erase operation is carried out, for example under control of another device, that is, a device other than the integrated circuit concerned. However, the erase operation may also be controlled and initiated by the integrated circuit itself.

In the subsequent step 105 the erase operation can be checked. If the erase operation was successful, for example when the memory is completely erased, then the sequence continues with step 106. If the erase operation was not successful, then the sequence returns in the present example to step 102 to check the validity of the security key again. This check is certain to fail, leading to step 103 in which the erase operation is enabled again. In some embodiments, the sequence may return directly to step 103.

In step 106 writing to the memory is enabled again, thus reversing the disabling of step 103, to allow the security key to be written in the next step. It is noted that reading from memory may have been enabled in step 105 to allow an erasure check only. As writing to memory is now enabled, the security key can now be written to memory in step 107. As mentioned before, this (second) security key must correspond with the (first) security key in the storage (12 in FIG. 1); the second security key may be identical or similar to the first security key. The security key stored in memory is proof that the integrated circuit, and in particular its memory, has been properly initialized. After step 107, the sequence returns to step 102 in which the security key is read from memory and checked for validity.

It can be seen that the sequence 100 ensures that the memory access verification step 108 can only be carried out when the memory holds a valid security key.

Figure 3:
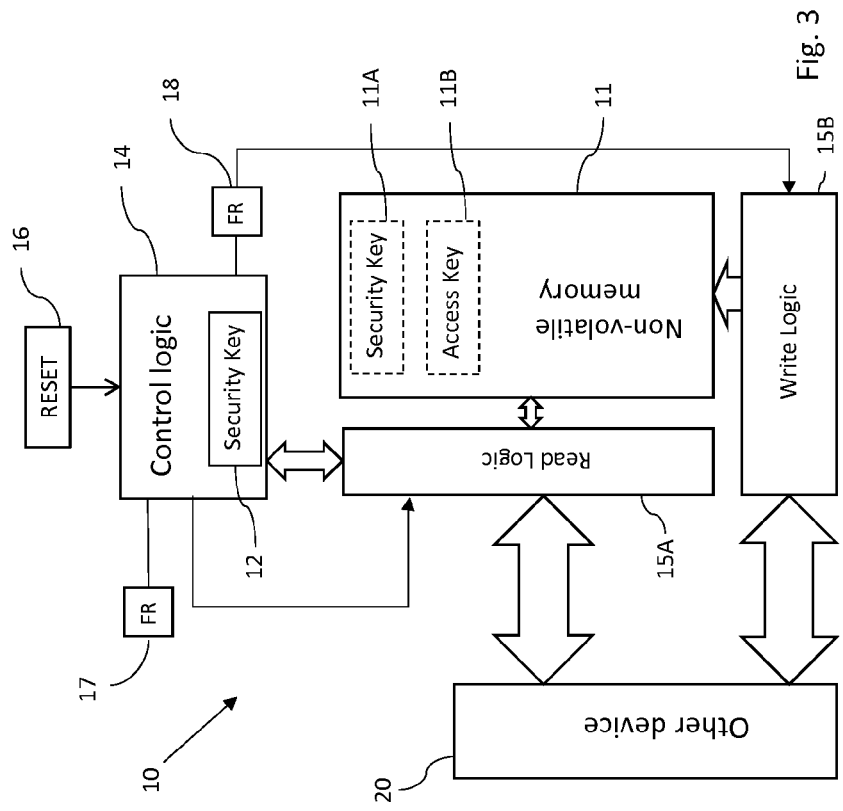
FIG. 3 schematically shows a second example of an embodiment of an integrated circuit including a memory.

Another embodiment of a portion of an integrated circuit is schematically shown in FIG. 3. The exemplary integrated circuit 10, which may include more components which are not shown for the sake of the clarity of the illustration, also includes a memory 11 and a key storage 12. In this embodiment, the key storage 12 is part of control logic 14 which serves as access control. The I/O unit 15 of FIG. 1 is here constituted by a read logic unit 15A and a write logic unit 15B, both of which are controlled by the control logic unit 14 and which allow data to be exchanged with another device 20 which may be located outside the integrated circuit 10.

The embodiment of FIG. 3 further includes a first flag register (FR) 17 and a second flag register (FR) 18, as well as a reset unit 16. The reset unit 16 serves to initiate a reset in response to a reset condition, which may be triggered by an externally provided reset request or by an internal reset condition, which may in turn depend on external input. In response to the reset condition, the reset unit 16 sends a reset signal to the control logic unit 14.

The first flag register 17 serves as "virgin device flag" and may, for example, store a first value (for example "1") when it has been established that the integrated circuit is uninitialized (that is, "virgin") and a second value (for example "0") when it is not. This may be accomplished by storing a suitable value in the first flag register in step 102 of the sequence of FIG. 2 upon detection of a valid security key. The second flag register 18 stores a flag indicating whether the erase, corresponding with step 105 in the sequence of FIG. 2, was successful. The flag registers 17 & 18 may be protected to prevent access from outside the integrated circuit and thus to prevent tampering. Both flag registers can be reset by a reset of the integrated circuit.

The second flag register 18 can be connected to both the control logic 14 and the write logic 15B as its flag determines whether the write logic is enabled or not. When the flag of the second flag register 18 is set in the embodiment of FIG. 3, the write logic 15B can be enabled. Conversely, when the flag of the second flag register 18 is not set, the write logic 15B can be disabled, thus making it impossible to write to the memory 11. The second flag register 18 may be set by hardware (the control logic unit 14) after a successful erase operation in which the memory 11 is erased. This erase operation may be a so-called "initial erase" which erases all blocks of the non-volatile memory 11 and may use a subsequent read back to ensure that all blocks are completely erased. This read back can use intermittent reads of a non-erased value to be able to detect any fake erase results. This allows identifying voltage attacks which mimic the detection of an erased value during read back. The second flag register 18 can also be set when a valid security key has been detected in step 102 of the sequence in FIG. 2 to permit later erase operations.

The memory 11 can hold the (second) security key in a memory area 11A. This (second) security key can be copied to the memory 11, from the (first) security key in the control logic 14 via the read logic 15A. The memory 11 may further store an access key in a memory area 11B. After storing the security key and/or the access key, writing to the memory area 11A and/or the memory area 11B may be disabled to prevent any tampering with the security key. It is noted that the (first) security key and/or the access key may have an equal amount of ones and zeroes. This serves to prevent security attacks based upon counting ones and zeroes, which may be achieved using suitable voltage measurements. Keys having equal amounts of ones and zeros may be obtained by replicating an inverse copy of a key (in which the ones and zeros have been inverted) and thus producing a double length key.

It is further noted that the memory 11 can be a non-volatile memory which preserves the stored data when the power is off. The memory 11 can be written to, in contrast to the storage 12 which cannot be written to and which may therefore be referred to as read-only memory.

The integrated circuit 10 may be a memory integrated circuit, or an integrated circuit containing a memory but having further components, such as a processor, for other tasks. One such task may be cryptographic operations, but the invention may well be applied to integrated circuits designed for other tasks than cryptographic operations.

Figure 4:
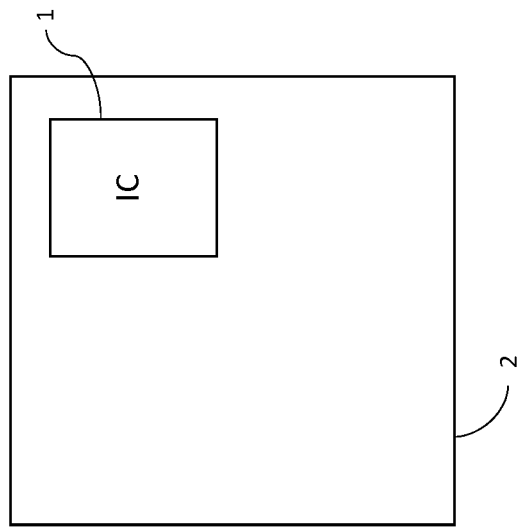
FIG. 4 schematically shows an example of an embodiment of a user device which includes an integrated circuit having a memory.

An exemplary embodiment of a user device is schematically illustrated in FIG. 4. The user device 2 is shown to include an integrated circuit (IC) 1, which can be an integrated circuit 1 as illustrated in FIG. 1 or an integrated circuit 10 as illustrated in FIG. 3. The user device 2 may be a mobile (cellular) telephone device, for example, or a navigation device, and can include further components which are not shown in FIG. 4. Such further components may include a keyboard or touchscreen, a display, a power source, and/or further integrated circuits.

It can be seen that a method provides secure access to an integrated circuit including an unalterable first security key and a memory, in which memory a second security key can be stored, which method may include checking the second security key by comparing the first security key and the second security key; if the second security key is valid, optionally requesting an access key from an external device and receiving an access key, optionally checking the received access key by comparing the received access key with a stored access key, and providing access to the integrated circuit, optionally in dependence of the received access key being valid; and if the second security key is invalid, restricting memory access to an erase operation, and after the erase operation, storing in the memory a new second security key which corresponds to the first security key. The checking of the second security key may be preceded by resetting the integrated circuit, while the erase operation may be followed by checking the erasing for completeness.

It can also be seen that a method is configured for initialising an integrated circuit including an unalterable first security key and a memory, in which memory a second security key may be stored, which method may include erasing the memory, and copying or writing the first security key into the memory.

It is preferred that the memory is erased completely during the erasing. More in particular, it is preferred that at least all memory locations containing security information are erased, for example the security key, the access key, any further keys and/or confidential data, and any confidential software and/or device configuration information. Additionally, or alternatively, to erasing the entire memory, the copied first security key may be permanently but erasably stored in memory so as to constitute a second security key which may be used for security purposes, e.g. to allow tampering detection.

It can further be seen that an integrated circuit may be provided including a processor, an unalterable first security key and a memory, in which memory a second security key may be stored, which processor may be configured for checking the second security key by comparing the first security key and the second security key; if the second security key is valid, optionally requesting an access key from an external device and receiving an access key, optionally checking the received access key by comparing the received access key with a stored access key, and providing access to the integrated circuit, optionally in dependence on the received access key being valid; and if the second security key is invalid, erasing the memory, and storing in the memory a new second security key which corresponds to the first security key. The processor may be configured for resetting the integrated circuit before checking the second security key. Additionally, or alternatively, the second security key may be stored in a protected part of the memory. The first security key may be hard-wired. The processor may be replaced with dedicated circuits, such as a comparator unit and an access control unit.

As will be clear from the above, a virgin device will be assumed when no valid security key is detected in the device. A virgin device can only be initialized by a procedure which guarantees the erasure of all data in memory. Detection of a valid security key guarantees that the device has been properly initialized.

In the foregoing specification, the invention has been described with reference to specific examples of embodiments of the invention. It will, however, be evident that various modifications and changes may be made therein without departing from the scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Devices functionally forming separate devices may be integrated in a single physical device. Also, the units and circuits may be suitably combined in one or more semiconductor devices.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps than those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An integrated circuit comprising:
   an unalterable storage to store a first security key;
   a memory to store a second security key;
   a comparator unit to compare the first security key and the second security key; and
   an access control unit to communicate with the comparator unit, the access control unit to check a validity of the second security key, and to:
   if the second security key is valid,
      provide access to the integrated circuit, and
   if the second security key is invalid,
      restrict memory access to an erase operation, and
      store, after the erase operation, a new second security key in the memory, wherein the new second security key corresponds to the first security key.

2. The integrated circuit according to claim 1, further comprising a control logic unit to reset the integrated circuit before checking the second security key.

3. The integrated circuit according to claim 1, wherein the memory comprises a protected part to store the second security key.

4. The integrated circuit according to claim 1, wherein the first security key stored in the storage has an equal amount of ones and zeros.

5. The integrated circuit according to claim 1, further comprising a protected flag register to store a flag indicating whether the erase operation is completed.

6. The integrated circuit according to claim 5, wherein writing to the memory is enabled only when the flag is set.

7. The integrated circuit according to claim 1, further comprising a protected flag register to store a flag indicating whether the integrated circuit has been initialized.

8. The integrated circuit according to claim 7, wherein the protected flag register is to be reset when the integrated circuit is reset.

9. The integrated circuit according to claim 1, wherein the access control unit to check the erase operation and to only permit a new security key to be stored in the memory if the erase operation was successful.

10. A user device comprising an integrated circuit, which integrated circuit comprises:
    an unalterable storage to store a first security key;
    a memory to store a second security key;
    a comparator unit configured to compare the first security key and the second security key; and
    an access control unit to communicate with the comparator unit, the access control unit to check a validity of the second security key, and to:
    if the second security key is valid,
       provide access to the integrated circuit, and
    if the second security key is invalid,
       restrict memory access to an erase operation, and
       store, after the erase operation, a new second security key in the memory wherein the new second security key corresponds to the first security key.

11. The user device according to claim 10, wherein the access control unit to check the erase operation and to only permit the new security key to be stored in the memory if the erase operation was successful.

12. A method of providing access to an integrated circuit, the method comprising:
comparing a first security key with a second security key, wherein the first security key is stored in an unalterable memory location and the second security key is stored in another memory location;
if the second security key matches the first security key, providing access to the integrated circuit; and
if the second security key fails to match the first security key,
restricting memory access to an erase operation, and
after the erase operation, storing in the memory a new second security key which corresponds to the first security key.

13. The method according to claim 12, wherein providing access to the integrated circuit if the second security key matches the first security key is preceded by:
requesting, from another device, an access key and receiving an access key,
checking the received access key by comparing the received access key with a access key stored in a further memory location, and
preventing said providing access to the integrated circuit if the received access key fails to match.

14. The method according to claim 12, further comprising resetting the integrated circuit prior to the comparing the first security key with the second security key.

15. The method according to claim 12, further comprising checking the erase operation for completeness subsequent to the erase operation.

16. The method according to claim 15, further comprising, if the erase operation is complete, recording completeness of the erase operation in a protected flag register subsequent to checking the erase operation for completeness.

17. The method according to claim 12, further comprising disabling read access prior to the erase operation.

18. The method according to claim 12, further comprising disabling programming prior to the erase operation.

19. The method according to claim 12, further comprising storing the second security key in a protected part of the memory.

20. The method according to claim 12, wherein the first security key has an equal amount of ones and zeros.

* * * * *